United States Patent [19]

Restout

[11] Patent Number: 4,815,901

[45] Date of Patent: Mar. 28, 1989

[54] APPARATUS FOR THE AUTOMATIC LAPPING OF WELDING ROBOT ELECTRODES

[75] Inventor: Albert G. L. Restout, Blanc Mesnil, France

[73] Assignees: Automobiles Peugeot, Paris; Automobiles Citroen, Neuilly sur Seine, both of France

[21] Appl. No.: 101,578

[22] Filed: Sep. 28, 1987

[51] Int. Cl.⁴ .................................................. B23C 1/20
[52] U.S. Cl. ...................................... 409/181; 219/119
[58] Field of Search ............ 409/181, 182, 138, 189, 409/140, 192, 203; 219/119, 120, 69 C, 69 M; 51/73 R; 901/41

[56] References Cited

U.S. PATENT DOCUMENTS

| | | | |
|---|---|---|---|
| 2,930,289 | 3/1960 | Swarts | 409/181 X |
| 4,668,136 | 5/1987 | Santa | 409/181 |

FOREIGN PATENT DOCUMENTS

| | | | |
|---|---|---|---|
| 2541192 | 3/1977 | Fed. Rep. of Germany | 219/119 |
| 3323038 | 1/1985 | Fed. Rep. of Germany | 219/119 |
| 118285 | 7/1984 | Japan | 219/119 |
| 133982 | 8/1984 | Japan | 219/119 |
| 159280 | 9/1984 | Japan | 219/119 |
| 3907 | 1/1985 | Japan | 219/119 |
| 180684 | 9/1985 | Japan | 219/119 |
| 524348 | 8/1940 | United Kingdom | 219/119 |

Primary Examiner—William Briggs
Attorney, Agent, or Firm—Herbert Dubno

[57] ABSTRACT

An apparatus is provided for the automatic lapping of welding robot electrodes including means for driving a lapping tool with a rotational movement, reciprocal or not, said tool being mounted on a support mounted for pivoting, with respect to a frame, about an axis parallel to the axis of the electrode or electrodes.

6 Claims, 3 Drawing Sheets

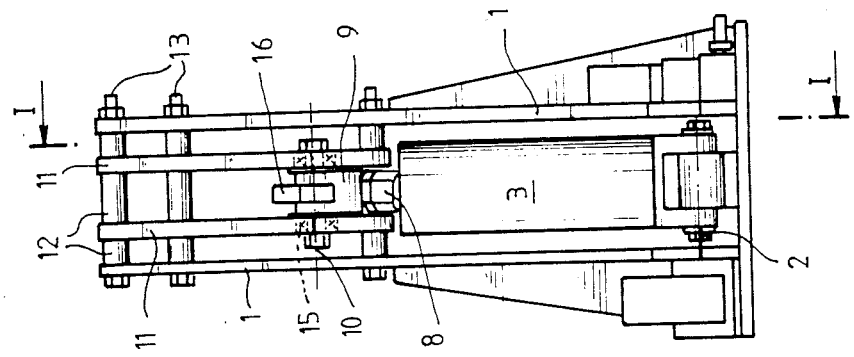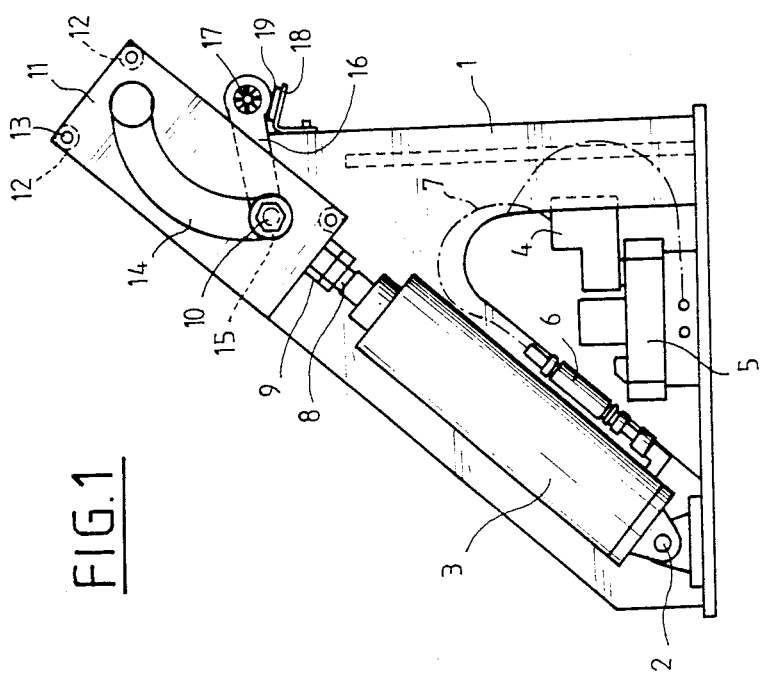

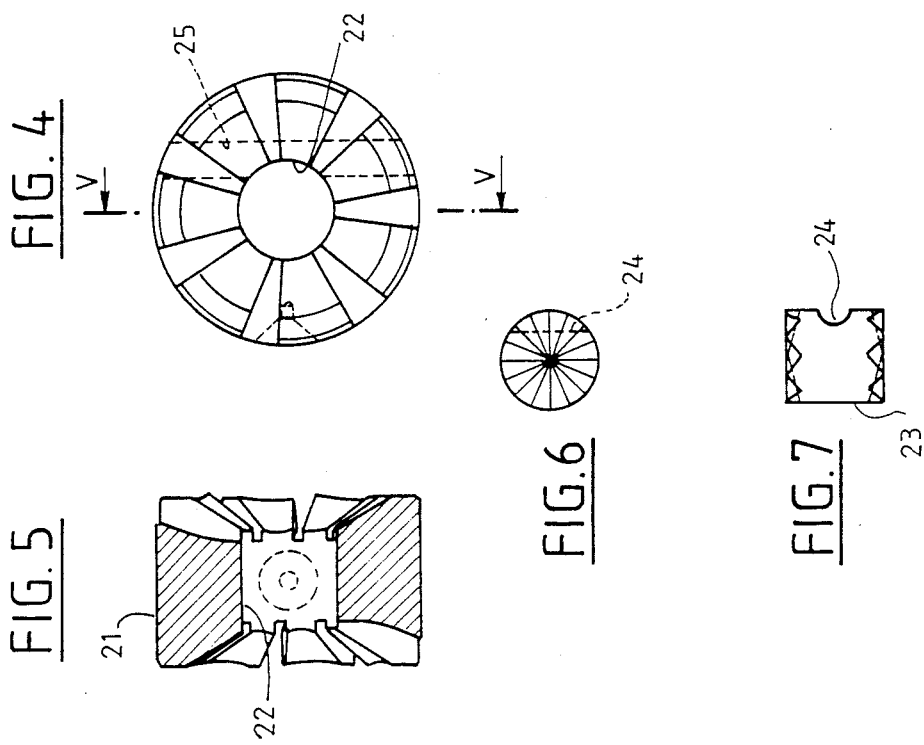
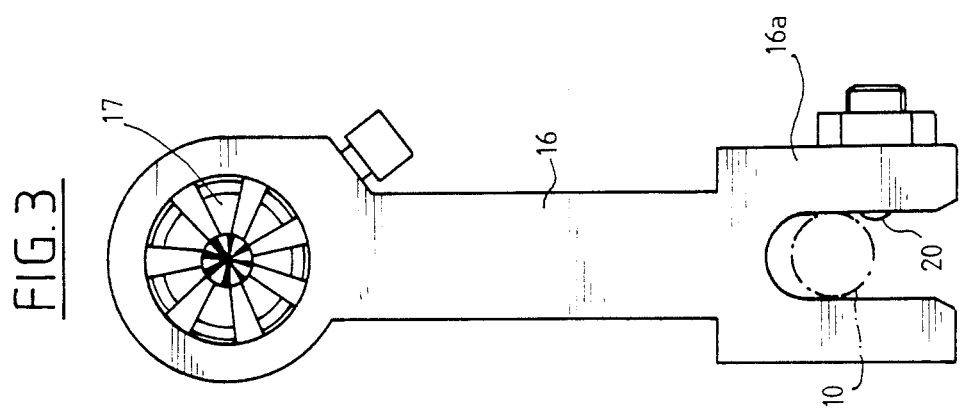

APPARATUS FOR THE AUTOMATIC LAPPING OF WELDING ROBOT ELECTRODES

FIELD OF THE INVENTION

The present invention relates to an apparatus for lapping welding robot electrodes.

BACKGROUND OF THE INVENTION

It is known that welding electrodes must be sequentially subjected to a lapping operation and that welding robots generally have two electrodes with truncated cone shaped ends which must be lapped on their conical portions and their flat portions.

An apparatus for the purpose described is controlled by the electronic brain of the robot for simultaneously lapping the two electrodes in a first operation so as to lap the conical portions and a second operation for lapping the flat ends. This apparatus comprises means for driving, with a simultaneous reciprocating rotational movement, a spindle having a milling tool for the conical portions and a spindle having a lapping tool for the flat portions, as well as means for centering the spindles with respect to the apparatus.

Because of the acceptable positional tolerance for the head of the robot, this head is subjected to a stress when the electrodes are engaged in the lapping tools. Furthermore, the welding electrodes form an angle with each other which may be large. When they are presented simultaneously for lapping they are not perpendicular to the axis of the milling tool. After a number of milling operations, the contact point between the electrodes and the milling tool moves in space, so that the head of the robot is increasingly stressed.

OBJECT OF THE INVENTION

It is an object of the invention to provide an electrode lapping apparatus which overcomes these drawbacks.

SUMMARY OF THE INVENTION

The apparatus of the invention, which overcomes the described drawbacks, has the tool mounted on a support mounted for pivoting, with respect to a frame, about an axis parallel to the axis of the electrode.

In accordance with a complementary feature of the invention, the lapping tool includes a milling tool with a double set of club teeth having an axial bore in which is fixed a member having flat teeth at each of its ends. The same tool may thus simultaneously effect lapping of the conical portions and of the flat portions of the two electrodes of the robot.

BRIEF DESCRIPTION OF THE DRAWINGS

Two embodiments of the apparatus of the invention will be described hereafter by way of non-limiting examples, with reference to the accompanying drawing in which:

FIG. 1 is a vertical sectional view taken along line I—I of FIG. 2, of a first embodiment;

FIG. 2 is an end view;

FIG. 3 is an elevational view of the link;

FIG. 4 is an end view of the milling tool with a double set of club teeth;

FIG. 5 is a diametrical section taken along line V—V of FIG. 4;

FIG. 6 is an end view of the member with flat teeth;

FIG. 7 is an elevational view;

SPECIFIC DESCRIPTION

Figure 8:
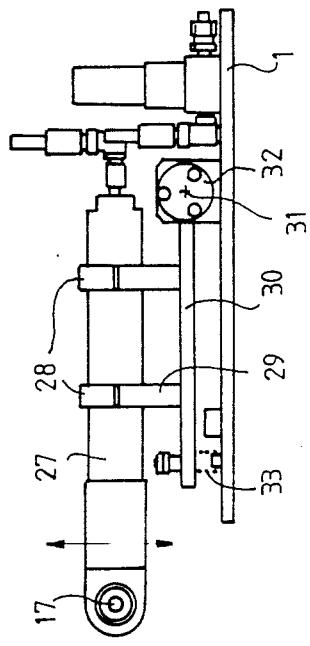
FIG. 8 is an elevational view of a second embodiment.
Figure 9:
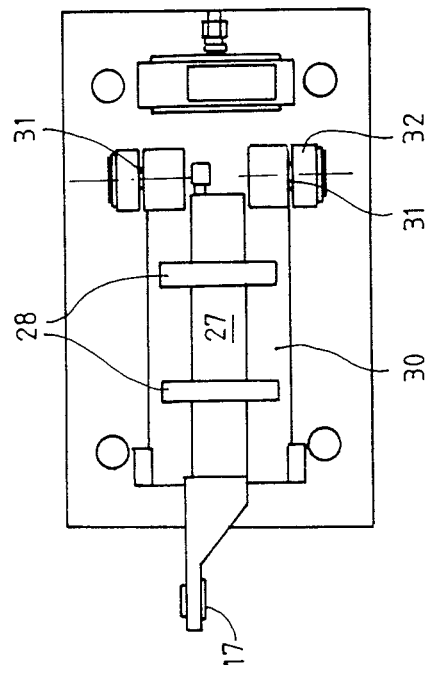
FIG. 9 is a top view.

In FIG. 1 can be seen a mecano-welded frame 1 to which is hingedly connected at 2 an actuating cylinder 3 with which are associated a pressure reducer 4, a distributor 5, a flow limiter 6 and supply ducts 7. To the rod 8 of the cylinder is fixed a fork joint 9 driving a shaft 10. Two rectangular plates 11 are fixed to the frame 1 by tubular spacers 12 and bolts 13. They are disposed on each side of the fork joint 9 and include an opening 14 in the form of the arc of a circle serving as cam. Shaft 10 is provided with rollers 15 engaged inside the openings 14.

A link 16 has at one of its ends a lapping tool 17 intended to cooperate with electrodes disposed parallel to shaft 10; this end is in abutment against a support 18 solidly secured to frame 1, through an elastomer stop 19. The other end of the link is hingedly connected with play to shaft 10. The length of the link is equal to the radius of the arc of a circle which shaft 10 describes and support 18 is disposed so that tool 17 is disposed in the center of the arc of the circle. When the cylinder is operating, tool 17 is driven with a reciprocal rotational movement, i.e. angularly its center remaining approximately fixed.

It will be noted here that the force exerted by the cylinder on the lapping tool generates a stress on the head of the robot; but this stress is negligible with respect to the positional stress which the invention seeks to eliminate by giving flexibility to the tool.

In FIG. 3 can be seen FIG. 3 shows the link 16 whose hinged end includes a stirrup 16a provided with a ball spring stop 20. Shaft 10, engaged in the stirrup, allows free motion defined by the position of the ball. To replace the link when the milling tool is worn, it is sufficient to exert a sufficient force to compress the spring and override the ball. This operation may be carried out sequentially by the robot.

The joint with clearance of link 16 allows it to adapt itself to the positional tolerance of the robot and of the electrodes after several lapping operations without subjecting the head of the robot to stresses.

FIGS. 4 to 7 show the lapping tool 17. It is formed of a milling tool 21 with a double set of club teeth having an axial bore 22. Inside bore 22 is engaged a cylindrical member 23 having radial teeth on its two end faces. Each set of teeth is formed of 8 radial edges situated in the plane of the active face of the member and between which are inserted 8 slanting edges. Inclined planes connect together the active edges and the slanting edges (FIGS. 6 and 7).

The cylindrical member 23 has on its peripheral surface a groove 24 perpendicular to the axis. This groove 24 cooperates with an excentric bore 25 of the conical milling tool 21 so as to allow a fixing pin to pass therethrough which interlocks the cylindrical member and the milling tool.

With this lapping tool 17, the truncated cone shaped portions of the two electrodes of the robot can be lapped by the teeth of the milling tool 21 and the flat portions of these electrodes can be lapped simultaneously by the teeth of the end faces of member 23.

FIG. 8 shows a variant of the device in which the tool is driven with a rotating movement.

In this variant, a pneumatic motor 27 is provided for rotating the lapping tool 17; this motor is fixed by flanges 28 to fork joints 29 mounted on a plate 30. Plate 30 has two coaxial pivots 31 resting on fork joints 32 providing the articulation with respect to frame 1 of the plate which further rests on two spring supports 33. The flexible mounting of the plate allows a free movement which avoids stressing the robot.

What is claimed is:

1. An apparatus for the automatic lapping of welding robot electrodes, comprising:
    a frame;
    a support mounted on said frame for pivoting relative to said frame about an axis parallel to a welding robot electrode;
    a lapping tool carried by said support and engageable with a welding robot electrode; and
    means operatively connected to said lapping tool for angularly displacing same, said means operatively connected to said lapping tool including:
    a link bearing on said frame and having said tool mounted on a first end of said link, and
    an articulated cylinder acting on a second end of said link for driving said second end in a movement through an arc of a circle centered on said tool.

2. The apparatus defined in claim 1 wherein the second end of said link is secured to a rod of said cylinder by a shaft having rollers which engage in openings in the form of arcs of a circle which form cams and are provided in two parallel plates.

3. The apparatus defined in claim 2 wherein said second end of said link is hingedly connected to said shaft with free motion by means of a spring ball, said apparatus further comprising an elastic stop on the frame for engagement by said first end of said link.

4. The apparatus defined in claim 1 wherein said tool is a milling tool with two sets of club teeth having an axial bore in which is fixed a cylindrical member having flat toothing at each of two ends.

5. An apparatus for the automatic lapping of welding robot electrodes, comprising:
    a frame;
    a support mounted on said frame for pivoting relative to said frame about an axis parallel to a welding robot electrode;
    a lapping tool carried by said support and engageable with a welding robot electrode;
    means operatively connected to said lapping tool for angularly displacing same, said means operatively connected to said lapping tool including:
    a drive motor carried by said support; and
    resilient stops on said frame, said support bearing against said stops.

6. The apparatus defined in claim 5 wherein said tool is a milling tool with two sets of club teeth having an axial bore in which is fixed a cylindrical member having flat toothing at each of two ends.

* * * * *